(12) United States Patent
Maier et al.

(10) Patent No.: US 9,914,342 B2
(45) Date of Patent: Mar. 13, 2018

(54) SHADING DEVICE FOR A TRANSPARENT SURFACE PART OF A MOTOR VEHICLE

(71) Applicants: Matthias Maier, Esslingen (DE); Herbert Walter, Ebersbach (DE)

(72) Inventors: Matthias Maier, Esslingen (DE); Herbert Walter, Ebersbach (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/813,300

(22) Filed: Jul. 30, 2015

(65) Prior Publication Data
US 2016/0031296 A1 Feb. 4, 2016

(30) Foreign Application Priority Data

Aug. 1, 2014 (DE) ........................ 10 2014 215 153

(51) Int. Cl.
*B60J 1/20* (2006.01)

(52) U.S. Cl.
CPC ............. *B60J 1/2063* (2013.01); *B60J 1/208* (2013.01); *B60J 1/2027* (2013.01); *B60J 1/2044* (2013.01); *B60J 1/2052* (2013.01)

(58) Field of Classification Search
CPC ...... B60J 1/2063; B60J 1/2027; B60J 1/2052; B60J 1/208; B60J 1/2044

(Continued)

(56) References Cited

U.S. PATENT DOCUMENTS

| 528,071 | A | * | 10/1894 | Branshaw | .............. | B60J 1/2044 |
| | | | | | | 160/271 |
| 5,067,546 | A | * | 11/1991 | Jeuffray | ................. | B60J 1/2063 |
| | | | | | | 160/23.1 |

(Continued)

FOREIGN PATENT DOCUMENTS

| DE | 100 19 787 A1 | 10/2001 |
| DE | 10 2004 017 023 A1 | 10/2005 |

(Continued)

OTHER PUBLICATIONS

Office Action of German Patent Office issued in Application No. 10 2014 215 153.8 dated Apr. 7, 2015 (5 pages).

*Primary Examiner* — Blair M Johnson
(74) *Attorney, Agent, or Firm* — Flynn, Thiel, Boutell & Tanis, P.C.

(57) ABSTRACT

Shading device for a transparent surface part of a motor vehicle having a flexible shading structure, two non-parallel lateral guide arrangements fixed with respect to the vehicle and having a dimensionally stable pull-out profile displaceable in parallel fashion by in each case one guide carriage in the respective lateral guide arrangement via a drive device, lateral shading structure sections protruding, in a manner dependent on the displacement travel of the shading structure, into lateral receiving spaces fixed with respect to the vehicle. To the lateral shading structure sections, there are fastened in each case two support bodies spaced apart from one another in the pulling-out direction of the shading structure and the thickness of which is greater than a thickness of the respective shading structure sections. The support bodies are guided in transversely supported fashion with play in complementary support channel sections of the receiving spaces.

19 Claims, 4 Drawing Sheets

(58) Field of Classification Search
USPC .................................. 160/273.1, 370.22
See application file for complete search history.

(56) References Cited

U.S. PATENT DOCUMENTS

| | | | |
|---|---|---|---|
| 6,179,373 B1 | 1/2001 | Bohm et al. | |
| 6,227,601 B1 | 5/2001 | LaFrance | |
| 6,422,291 B1 | 7/2002 | Brunnert et al. | |
| 6,739,375 B2 | 5/2004 | Schlecht et al. | |
| 7,059,651 B2 | 6/2006 | Böhm et al. | |
| 7,896,057 B2 | 3/2011 | Walter et al. | |
| 8,113,265 B2* | 2/2012 | Hardison, III | E06B 9/13 160/179 |
| 8,905,116 B2 | 12/2014 | Weinbrenner | |
| 9,616,733 B2* | 4/2017 | Maier | B60J 3/0243 |
| 9,764,624 B2* | 9/2017 | Maier | B60J 1/2063 |
| 2001/0017194 A1 | 8/2001 | Schlecht et al. | |
| 2002/0033244 A1 | 3/2002 | Schlecht et al. | |
| 2007/0144689 A1 | 6/2007 | Walter et al. | |
| 2010/0000692 A1* | 1/2010 | Coenraets | E06B 9/581 160/323.1 |
| 2012/0186756 A1 | 7/2012 | Lin | |
| 2016/0031294 A1* | 2/2016 | Maier | B60J 1/2011 160/370.21 |
| 2016/0031295 A1* | 2/2016 | Maier | B60J 1/2011 160/370.21 |
| 2016/0031296 A1* | 2/2016 | Maier | B60J 3/02 296/97.8 |
| 2016/0031297 A1 | 2/2016 | Maier | |

FOREIGN PATENT DOCUMENTS

| | | |
|---|---|---|
| DE | 10 2012 222 658 A1 | 6/2014 |
| EP | 1 123 825 A2 | 8/2001 |
| EP | 1 582 386 B1 | 10/2005 |
| EP | 1 800 922 A1 | 6/2007 |
| WO | WO 2014/090759 A1 | 6/2014 |

* cited by examiner

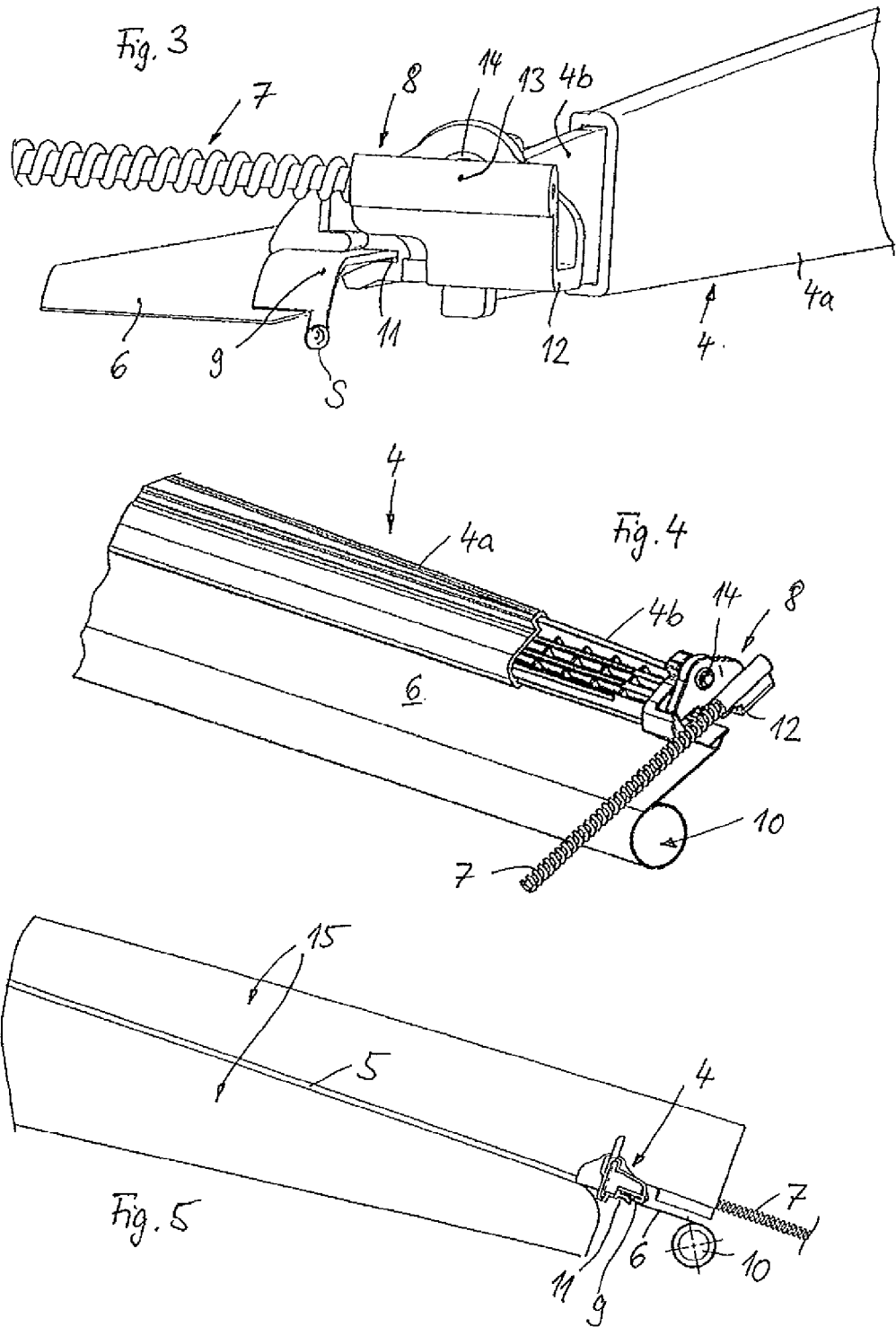

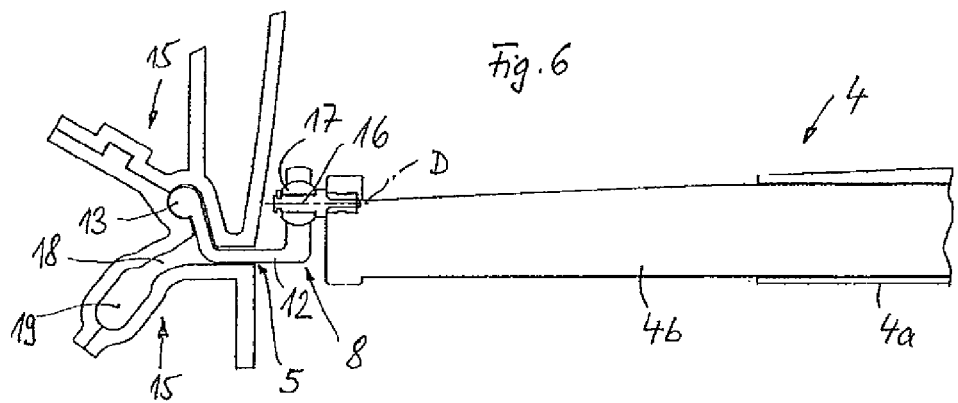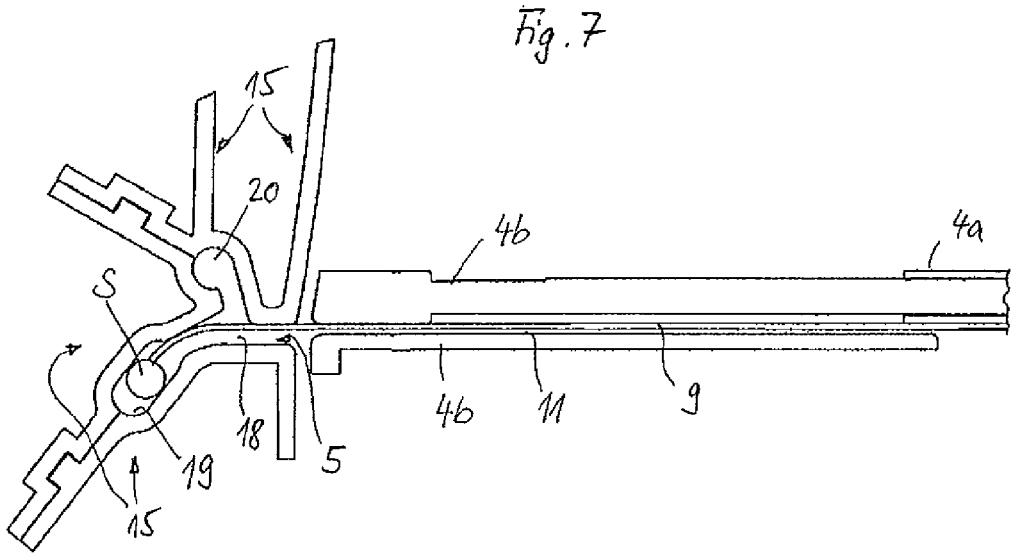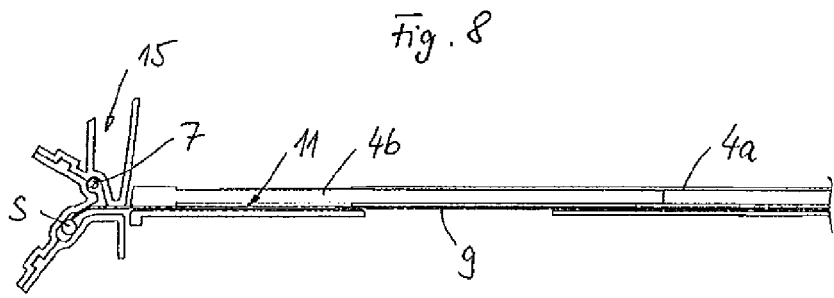

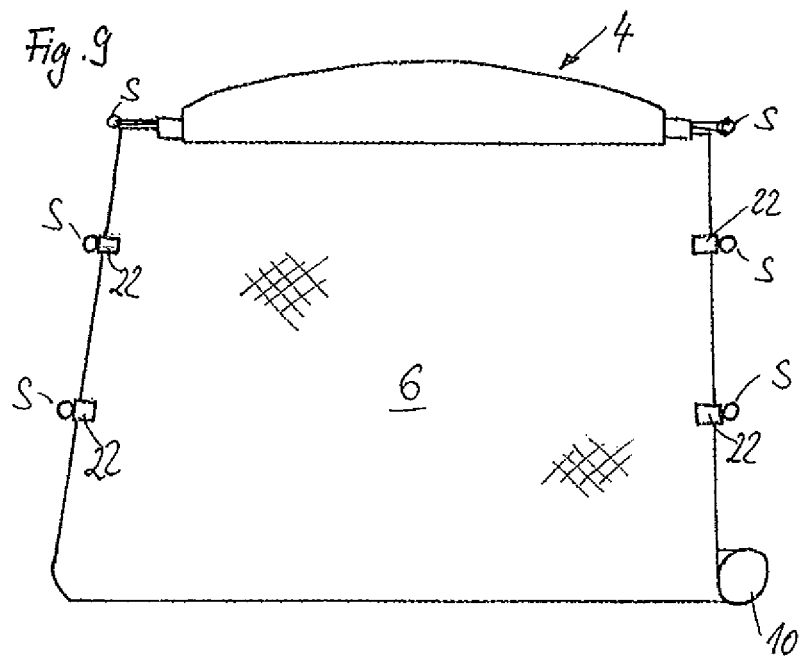
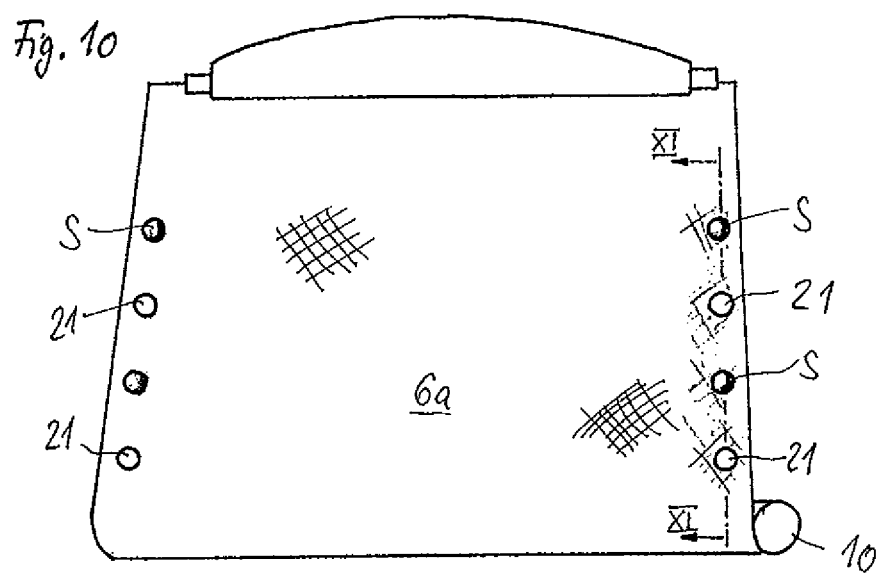
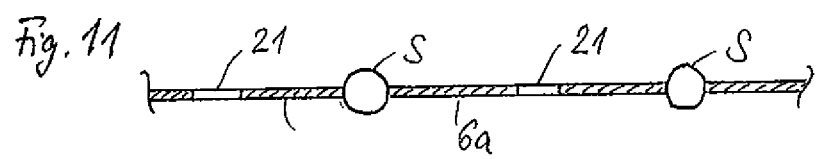

SHADING DEVICE FOR A TRANSPARENT SURFACE PART OF A MOTOR VEHICLE

CROSS-REFERENCE TO RELATED APPLICATIONS

This application claims the priority of the German patent application DE 10 2014 215 153.8, the disclosure of which is hereby incorporated by reference in its entirety into this application.

FIELD OF THE INVENTION

The invention relates to a shading device for a transparent surface part of a motor vehicle, having a flexible shading structure which can be displaced between a rest position, in which it is stowed in a compact manner, and a shading position, in which it covers the transparent surface part, in a vehicle interior, having two non-parallel lateral guide arrangements which are fixed with respect to the vehicle and which flank a displacement travel of the shading structure on opposite sides, and having a dimensionally stable pull-out profile which is arranged on a front face end region of the shading structure as viewed in the pulling-out direction, the pull-out profile, at its opposite face sides, being displaceable in parallel fashion by means of in each case one guide carriage in the respective lateral guide arrangement by way of drive means which engage on the guide carriages, and lateral shading structure sections protruding, in a manner dependent on the displacement travel of the shading structure, into lateral receiving spaces which are fixed with respect to the vehicle and which are assigned to the opposite guide arrangements.

BACKGROUND OF THE INVENTION

A shading device of said type is known from EP 1 800 922 B1. The known shading device is provided for a rear window arrangement of a passenger motor vehicle. The shading device comprises a web-like shading structure of rectangular form. The shading structure is held, such that it can be wound up and unwound, on a winding shaft which is mounted rotatably underneath a rear parcel shelf of the vehicle interior. On a front face end region of the shading structure as viewed in the pulling-out direction, there is provided a pull-out profile on which the face end region of the shading structure is held by means of a transverse guidance strip. The pull-out profile is, at opposite face sides, guided displaceably in parallel fashion in non-parallel guide arrangements which are fixed with respect to the vehicle. In each lateral guide arrangement there is furthermore provided a drive transmission means in the form of a flexible shaft which linearly displaces a guide carriage on which the pull-out profile is arranged. By corresponding parallel displacement of the pull-out profile, the shading structure is displaced between its rest position and its shading position. Since the shading structure is of rectangular form, but the guide arrangements are however oriented non-parallel to one another, it is the case that, over the displacement travel of the shading structure, lateral shading structure sections protrude into the lateral guide arrangements. For this purpose, in the region of the lateral guide arrangements, there are provided receiving spaces which receive the lateral shading structure sections protruding therein.

SUMMARY OF THE INVENTION

It is an object of the invention to provide a shading device of the type mentioned in the introduction which has an improved shading function in relation to the prior art.

Said object is achieved in that, to the lateral shading structure sections, there are fastened in each case at least two support bodies which are spaced apart from one another in the pulling-out direction of the shading structure and the thickness of which is greater than a thickness of the respective shading structure section and which are guided in transversely supported fashion with play in complementary support channel sections of the receiving spaces. By means of the solution according to the invention, a situation is prevented in which the lateral shading structure sections protruding into the lateral receiving spaces are pulled out of the receiving spaces. Thus, according to the invention, loads on the stretched-out shading structure cannot cause the lateral shading structure sections to be pulled out toward the middle of the shading structure. In this way, a particularly reliable shading function and reliable transfer of the shading structure between the different end positions, that is to say the rest position and the shading position, are ensured. This is because the support bodies secure the lateral shading structure sections in the receiving spaces without impairing the sliding movement, that is to say displacement movements, of the shading structure by increased friction. In the longitudinal direction, that is to say the pulling-out direction, of the shading structure, the support bodies slide virtually without play in the support channel sections, but in the transverse direction toward the middle of the shading structure, corresponding wall sections of the support channel section support the support bodies with a form fit such that said support bodies cannot emerge from the support channel sections transversely toward the middle. The solution according to the invention serves in particular to prevent a malfunction of the shading device. This is because, if the lateral shading structure sections have been pulled out of the receiving spaces, it is no longer possible for the shading structure to be reliably wound up on a winding shaft, and accordingly for it to be returned into the rest position. The solution according to the invention avoids these disadvantages. The solution according to the invention can particularly advantageously be used for the shading of a rear window arrangement of a passenger motor vehicle, wherein complete shading brings an increase in comfort for persons seated on a rear seat bench of the passenger motor vehicle.

In a refinement of the invention, the guidance of the support bodies with play in the support channel sections is such that the sliding of the support bodies in the support channel sections yields virtually no increase in the overall friction forces during a displacement of the shading structure between the rest position and the shading position. The support bodies therefore interact significantly with the support channel sections only when the shading structure is subjected to transverse forces which exert tensile loads on the lateral shading structure sections in the transverse direction toward the middle of the shading structure. In said transverse direction, the support channel sections are tapering such that the support bodies are retained in a form-fitting manner.

In a further refinement of the invention, the support bodies are positioned laterally outside a respective longitudinal edge of the respective lateral shading structure section and are fastened by way of laterally projecting tab or strip sections to the respective shading structure section. This refinement is advantageous if the shading structure, in the manner of a web, is wound up on a winding shaft. Owing to the positioning of the support bodies laterally outside the surface of the shading structure, it is possible for the shading structure to be fully wound up on the winding shaft without winding errors or winding thickenings arising owing to support bodies being situated in between. This is because the support bodies are guided laterally outside the winding shaft and do not adversely affect the winding thickness of the shading structure on the winding shaft.

In a further refinement of the invention, the support bodies are integrated into the lateral shading structure sections, each support body being assigned, spaced apart in the longitudinal direction, a complementary cutout in the shading structure, into which cutout the respective support body protrudes when the shading structure is wound up on a winding shaft. This refinement, too, ensures error-free winding of the shading structure on the winding shaft, as the thickening realized by the support bodies protrudes in each case into a complementary cutout during the winding process, such that no thickening or no significant thickening of the winding arises even in the region of the support bodies. The thickness of the support body is advantageously at most not significantly greater than twice the thickness of the shading structure, such that in the wound-up state, a protruding part of the support body protrudes into the complementary cutout of the winding layer situated therebelow and/or thereabove.

Further advantages and features of the invention will emerge from the claims and from the following description of preferred exemplary embodiments of the invention, which are illustrated on the basis of the drawings.

BRIEF DESCRIPTION OF THE DRAWINGS

FIG. 3 is an enlarged perspective illustration of a detail of the shading device as per FIGS. 1 and 2, FIG. 4 is another perspective illustration of the shading device as per FIG. 3, FIG. 5 shows a side view of the shading device as per FIGS. 1 to 4, FIG. 6 is an enlarged schematic cross-sectional illustration of a subregion of the shading device as per FIGS. 1 to 5, FIG. 7 is a further cross-sectional illustration of the shading device in a section plane parallel to the section plane as per FIG. 6, FIG. 8 is a further cross-sectional illustration, in a further section plane which is parallel to that in the illustrations of FIGS. 6 and 7, of a subregion of the shading device as per FIGS. 1 to 7, FIG. 9 schematically shows a shading structure of the shading device as per FIGS. 1 to 8, FIG. 10 schematically shows a further shading structure of a further embodiment of a shading device according to the invention, similar to FIG. 9, and FIG. 11 is an enlarged schematic illustration along the section line XI-XI in FIG. 10.

DETAILED DESCRIPTION

Figure 1:
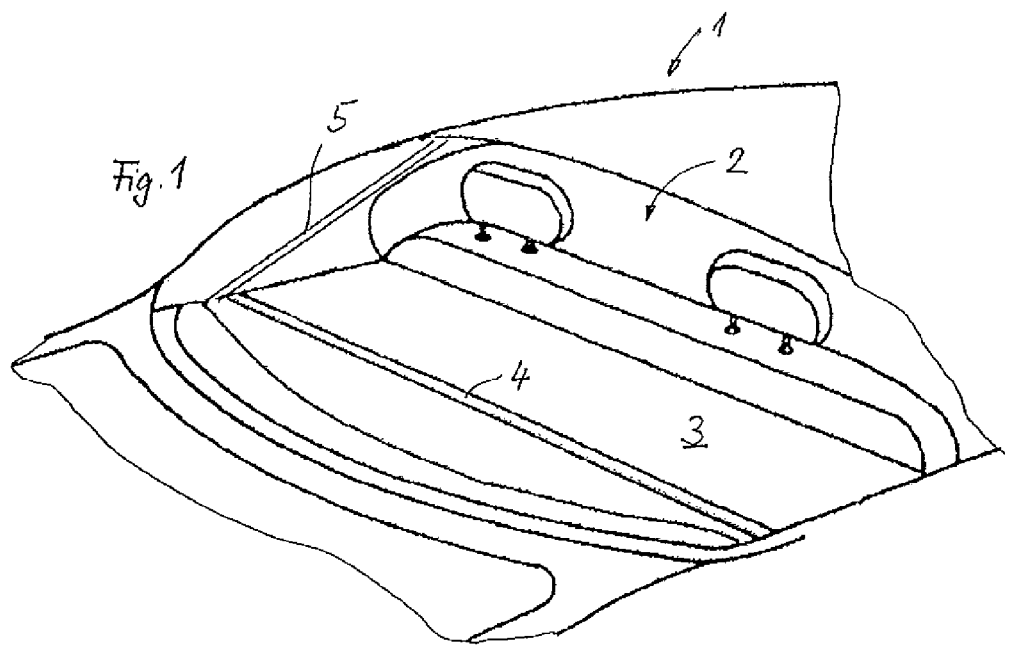
FIG. 1 schematically shows a part of a passenger motor vehicle in the region of a rear window arrangement, which at the vehicle interior side is assigned an embodiment of a shading device according to the invention.
Figure 2:
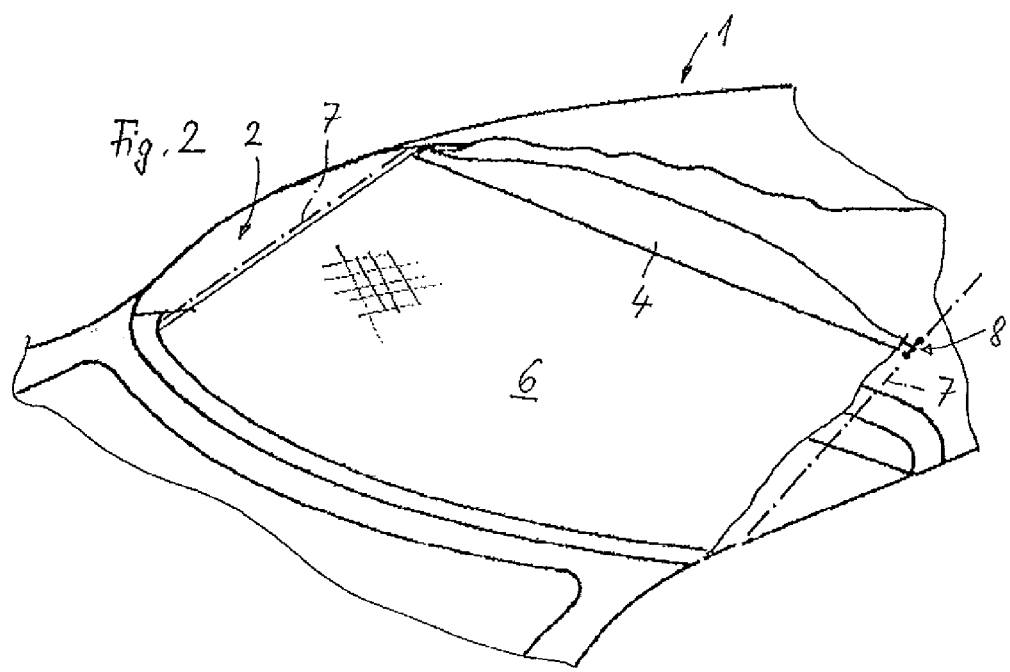
FIG. 2 is the illustration as per FIG. 1, in which the shading device has been transferred into its shading position.

A passenger motor vehicle 1 has, as per FIGS. 1 and 2, a rear window arrangement 2 which delimits a vehicle interior compartment, above a vehicle sill, toward the rear. In the vehicle interior, there is provided below the rear window arrangement 2 a parcel shelf 3 which may be part of a load-bearing body structure of the passenger motor vehicle 1. The parcel shelf 3 is adjoined in the forward direction by a backrest arrangement of a rear seat bench.

To reduce light radiation through the rear window arrangement 2 from the outside, the rear window arrangement 2 is assigned a shading device as per FIGS. 1 to 9, which will be described in more detail below. The shading device has a flexible shading structure 6 which, in the manner of a web, is held on a winding shaft 10 such that it can be wound up and unwound. The winding shaft 10 is mounted rotatably underneath the rear parcel shelf 3 with an axis of rotation extending in the vehicle transverse direction. In the region of the parcel shelf 3 there is provided a passage slot (not illustrated in any more detail) through which the shading structure 6 is passed during a movement from the rest position (FIG. 1) into the shading position (FIG. 2). The shading structure 6 has an at least substantially rectangular shape and is wound uniformly in multiple layers on the winding shaft 10. At a front face end region as viewed in the pulling-out direction, the shading structure 6 is fastened to a pull-out profile 4 which extends over the entire width of the shading structure 6. The pull-out profile 4 is, at its opposite face ends, held in longitudinally displaceable fashion by means of in each case one guide carriage 8 (FIGS. 3 and 4) in lateral guide arrangements which are fixed with respect to the vehicle. As can be seen from FIG. 1 and FIG. 2, the lateral guide arrangements which are fixed with respect to the vehicle are fastened in the region of C pillar sections of the body support structure. Each lateral guide arrangement has a guide slot 5 which is open toward the middle of the vehicle, the design and function of which guide slot will be described in more detail below. The guide slot 5 is preferably integrated in each case flush into an interior lining part which is arranged in the region of the respective C-pillar section.

The pull-out profile 4 is made up of a middle part 4a, which is configured as a hollow profile, and two lateral telescopic sections 4b which are arranged on opposite sides of the middle part 4a and which are guided in longitudinally displaceable fashion in the middle part 4a. The guide carriages 8 are connected to the face side of the respective telescopic section 4b. The two telescopic sections 4b are mounted in the middle part 4a so as to be displaceable in the longitudinal direction of the pull-out profile 4, in order that the overall length of the pull-out profile 4 can be varied. The variation of the overall length of the pull-out profile 4 is necessary as the lateral guide arrangements and also the guide slots 5 do not run parallel with respect to one another but are inclined toward the middle and accordingly taper toward one another proceeding from the parcel shelf 3 in the direction of the roof lining of the vehicle interior. The pull-out profile 4 is, via its two telescopic sections 4b, mounted rotatably relative to the two guide carriages 8 by means of in each case one ball joint arrangement 14. The two ball joint arrangements 14 define, for the pull-out profile 4, an axis of rotation D relative to the opposite guide carriages 8, said axis of rotation being arranged eccentrically with respect to a central longitudinal axis of the pull-out profile 4. As can be seen from FIG. 6, the ball joint arrangement 14 comprises firstly a bearing journal 16 which projects laterally outward from the telescopic section 4b coaxially with respect to the axis of rotation D, and secondly a ball joint 17 which is mounted on the guide carriage 8 and into which the bearing journal 16 engages coaxially. An axial securing ring (not designated in any more detail) secures the bearing journal 16 axially on the ball joint 17.

The guide carriage 8 has a laterally outwardly projecting guide projection 12 which is angled upward and transitions into a cylindrical guide body 13 to which a drive transmission strand, which is rigid under compression, in the form of a flexible shaft 7 is coaxially connected (FIGS. 3 and 4). The flexible shaft 7 is driven in longitudinally displaceable fashion by way of a gearwheel mechanism which is acted on by an electric drive motor in synchronism with the opposite flexible shaft 7 in a manner not illustrated in detail.

The two lateral guide arrangements and both sides of the pull-out profile 4 and both sides of the shading structure 6 are designed mirror-symmetrically but otherwise identically to one another, such that in order to avoid repetitions, only one side will be described in detail.

The guide body 13 of the guide carriage 8 is guided in linearly displaceable fashion in a guide channel 20 of the lateral guide arrangement which is fixed with respect to the vehicle and which, within the meaning of the invention, serves as receiving space. The guide channel 20 furthermore guides the respective flexible shaft 7. The laterally outwardly projecting guide projection 12 of the guide carriage 8 projects into the guide slot 5, which is open toward the upwardly leading guide channel 20. Furthermore, the guide slot 5 is adjoined laterally to the outside and in the downward direction by a narrow receiving space 18 which comprises a widened support channel section 19. Both the guide slot 5 and the guide channel 20, the receiving space 18 and the support channel section 19 extend, as viewed in the longitudinal direction of the shading structure 6, continuously at least over an entire movement travel of the pull-out profile 4 and thus over the displacement travel of the shading structure 6 between its rest position (FIG. 1) and its shading position (FIG. 2).

The guide slot 5, the guide channel 20, the receiving space 18 and the support channel section 19 are integrated in a housing structure 15 which is composed of multiple interconnected shell sections. The shell sections may be produced from plastic or from metal. It can be seen from FIGS. 6 to 8 that the housing structure 15 is composed of three interconnected shell sections which are mounted fixedly with respect to the vehicle by being fixedly connected in particular to adjoining vehicle interior lining parts and/or load-bearing body parts.

The shading structure 6 is connected to the pull-out profile 4 via a transverse guidance strip 9 which extends continuously over an entire width of the shading structure 6 transversely with respect to the pulling-out direction of the shading structure 6. The transverse guidance strip 9 exhibits greater stiffness than the flexible shading structure 6 and is produced from a PTFE strip with a width of 10 mm and a thickness of 0.5 mm. The transverse guidance strip 9 is connected to the front face end region of the shading structure 6 in continuous fashion over the entire width of the shading structure 6 by adhesive bonding or being sewn into a face-side loop. The transverse guidance strip 9 is held on the pull-out profile 4 by being inserted with a form fit into a receiving slot of the middle part 4a of the pull-out profile 4. The transverse guidance strip 9 is furthermore also connected to the pull-out profile 4 by way of its lateral guidance strip sections which extend in the region of the telescopic sections 4b of the pull-out profile 4. For this purpose, each telescopic section 4b is equipped with a sliding guide channel 11 by virtue of the respective lateral guidance strip section of the transverse guidance strip 9 being supported in linearly movable fashion. The transverse guide channel 11 extends over a maximum pull-out length of the telescopic section 4b relative to the middle part 4a, such that the transverse guidance strip 9 is supported in linearly movable fashion at least largely over an entire width of the pull-out profile 4.

The transverse guidance strip 9 has, at its opposite face ends laterally outside the respective longitudinal edge of the shading structure 6, a tab projection onto which a pearl-like support body S is molded or fastened in some other way. Said support body S is inserted into the support channel section 19 of the housing structure 15 in the longitudinal direction of the shading structure 6 and prevents the transverse guidance strip 9 from being able to be pulled out of the support channel section 19 by a transverse force directed toward the middle of the vehicle. This is because the tapering of the receiving space at the transition from the support channel section 19 to the narrow receiving space 18 causes the support body S to be supported with a form fit in the transverse direction. The transverse guidance strip 9 is, by way of its lateral guidance strip sections, curved downward in the guide slot 5 and in the receiving space 18 and hereby guides the adjoining lateral shading structure sections of the shading structure 6 into the receiving space 18 and into the support channel section 19 during a longitudinal displacement of the pull-out profile 4 along the guide slots 5. Accordingly, during a displacement of the shading structure 6 from the rest position into the shading position, the receiving space 18 and the support channel section 19 store the shading structure sections of the rectangular shading structure which have been inserted laterally into the guide slot 5. The lateral shading structure sections enter and pass through the respective guide slot 5 in a manner analogous to that in the prior art (EP 1 800 922 B2), firstly owing to the lateral guide arrangements and guide slots 5 which are fixed with respect to the vehicle and which taper toward one another and secondly owing to the parallel extending of the lateral longitudinal edges of the rectangular shading structure, during the winding-up or unwinding of the shading structure 6 by way of a longitudinal displacement of the pull-out profile 4.

As is evident on the basis of FIG. 5, the transverse guidance strip 9 which is connected at the face side to the shading structure 6 forms a piping which is inserted with a form fit into the receiving slot, which is configured as a piping channel, of the middle part 4a. The sliding guide channels 11 of the telescopic sections 4b also form piping-like grooves, with the difference that, in the region of the sliding guide channels 11, the telescopic sections 4b are arranged so as to be longitudinally displaceable relative to the transverse guidance strip 9.

From FIG. 5 and from FIG. 1, it can be seen that the guide slots 5 in each housing structure 15 run firstly rectilinearly and secondly in the pulling-out plane of the shading structure 6. The receiving slot of the middle part 4a and the sliding guide channels 11 of the telescopic sections 4b are in alignment with one another in the longitudinal direction of the pull-out profile 4, resulting in rectilinear and planar support of the transverse guidance strip 9. This piping-like receptacle of the transverse guiding strip 9 in the pull-out profile 4 is provided at a distance from the axis of rotation D about which the pull-out profile 4 is mounted rotatably on the opposite guide carriages 8. The shading structure 6 is subjected to a permanent tensile force by virtue of a restoring spring arrangement being integrated in the winding shaft 10, which restoring spring arrangement exerts a torque on the winding shaft 10 in the winding-up direction. By means of this application of torque, the shading structure 6 exerts, by way of the transverse guidance strip 9 which is held in the pull-out profile 4, a torque on the pull-out profile 4 about the axis of rotation D, such that the pull-out profile 4 is oriented in the orientation as per FIGS. 4 and 5 while the pull-out profile 4 is moved from the rest position into the shading position or vice versa. The shading position or the end position may be assigned abutments which compensate the torque loading of the pull-out profile 4 and pivot the pull-out profile 4, in the corresponding end position, into a different orientation relative to the guide carriages 8.

In order that, over the further course of the length of the shading structure 6, the lateral shading structure sections are prevented from undesirably being pulled out of the corresponding receiving space 18, 19 with the respective housing structure 15, it is the case that, distributed over the length of the shading structure 6, on each side, the respective lateral longitudinal edge of the shading structure 6 is assigned two further support bodies S which are connected by way of fastening tabs 22 to the lateral shading structure sections. The support bodies S are also of pearl-like form and are coordinated in terms of their dimensions with the support channel section 19 so as to be longitudinally displaceable therein with play. During a displacement of the shading structure 6 by means of the pull-out profile 4 in the guide slots 5 of the housing structures 15, the further support bodies S also slide into the support channel sections 19 such that transverse support is realized substantially over the entire pulling-out length of the shading structure 6, which transverse support reliably prevents the shading structure from sliding out of the respective guide slot 5. As the shading structure 6 is wound up on the winding shaft 10, the support bodies S with the fastening tabs 22 are imperatively jointly wound up outside the respective face edge of the winding shaft 10, such that no change in the thickness of the winding layers occurs owing to said support bodies S.

In the embodiment as per FIGS. 10 and 11, corresponding support bodies S are integrated into the lateral shading structure sections by virtue of said support bodies, as pearl-like support bodies, being connected to the shading structure 6a, which is in the form of a knitted or woven fabric. In order that, as the shading structure 6a is wound up on the winding shaft 10, thickenings of the winding layers are prevented in the region of said support bodies S which are arranged in alignment with one another in the longitudinal direction of the shading structure 6a, each support body S is assigned a complementary cutout 21 in the respective lateral shading structure section, into which cutout the respective support body S can protrude as the shading structure 6a is wound up onto the winding shaft 10. In this way, it is likewise possible to prevent or at least largely reduce a thickening of the winding layers at the level of the support bodies S during a corresponding winding-up process of the shading structure 6a.

The invention claimed is:

1. A shading device for a transparent surface part of a motor vehicle, comprising:
   a flexible and rectangular shading structure which can be displaced between a rest position, in which the shading structure is stowed in a compact manner, and a shading position, in which the shading structure covers the transparent surface part in a vehicle interior;
   two non-parallel lateral guide arrangements which are fixed with respect to the vehicle and which flank a displacement travel of the shading structure on opposite sides thereof, and which taper towards each other at tops thereof;
   a substantially non-flexible pull-out profile which is arranged on a front face end region of the shading structure as viewed in a pulling-out direction;
   a transverse guide strip that extends continuously over an entire width of the shading structure transversely with respect to the pulling-out direction, the guide strip connecting the shading structure to the pull-out profile such that the shading structure is not directly connected to the pull-out profile;
   the pull-out profile, at opposite face sides thereof, being displaceable in parallel fashion in each case by one guide carriage in a respective one of the lateral guide arrangements by way of a drive which engages on the guide carriage; and
   a pair of lateral shading structure sections of the shading structure protruding, in a manner dependent on a displacement travel of the shading structure, into lateral receiving spaces which are configured to be fixed with respect to the vehicle and which are assigned to the guide arrangements;
   wherein each of the lateral shading structure sections comprises at least two support bodies which are spaced apart from one another in the pulling-out direction of the shading structure and a thickness of which is greater than a thickness of the shading structure and which are guided in transversely supported fashion with play in complementary support channel sections of the receiving spaces, each of the at least two support bodies on each lateral shading structure section moving along a single line as the shading structure moves between the rest position and the shading position; and
   wherein each of the support channel sections of the receiving spaces includes, in cross-section, a pair of elongate opposite aligned walls having an open entrance area at one end of the pair of walls and an end area at the other end of the pair of walls, each of the support bodies moving within the support channel sections of the receiving spaces flanked by the pair of elongate opposite aligned walls between the open entrance area of the support channel sections of the receiving spaces and the end area, with the support bodies moving toward and away from the open entrance area and the end area as the shading structure moves between the rest position and the shading position.

2. The shading device as claimed in claim 1, wherein guidance of the support bodies with play in the support channel sections is such that sliding of the support bodies in the support channel sections yields virtually no increase in overall friction forces during a displacement of the shading structure between the rest position and the shading position.

3. The shading device as claimed in claim 1, wherein the support bodies are positioned laterally outside a respective longitudinal edge of the respective lateral shading structure section and are fastened by way of laterally projecting tab or strip sections to the respective shading structure section.

4. The shading device as claimed in claim 1, wherein the support bodies are integrated into the lateral shading structure sections, each support body being assigned, spaced apart in the longitudinal direction, a complementary cutout in the shading structure, into which cutout the respective support body protrudes when the shading structure is wound up on a winding shaft.

5. The shading device as claimed in claim 1, wherein the pair of elongate opposite aligned walls are continuous between the open entrance area and the end area.

6. The shading device as claimed in claim 1, wherein the elongate opposite aligned walls are longer than spaces between the elongate opposite aligned walls at the open entrance area and at the end area.

7. The shading device as claimed in claim 6, wherein the pair of lateral shading structure sections of the shading structure protrude into the receiving spaces at the open entrance area.

8. The shading device as claimed in claim 1, wherein the support bodies move within the support channel sections of the receiving spaces along a movement direction line, with the movement direction line extending through the open entrance area.

9. The shading device as claimed in claim 8, wherein the movement direction line is straight.

10. The shading device as claimed in claim 1, wherein the pull-out profile comprises at least one sliding guide track extending along the pull-out profile for the transverse guide strip to slide freely therein.

11. A shading device for a transparent surface part of a motor vehicle, the shading device comprising:
   a flexible rectangular shading structure displacable between a rest position wherein the flexible shading structure is stowed in a compact manner and a shading position wherein the flexible shading structure is configured to cover the transparent surface part;
   two non-parallel lateral guide arrangements flanking the shading structure on opposite sides thereof;
   a substantially non-flexible pull-out profile arranged at a front face end region of the flexible shading structure as viewed in a pulling-out direction, the pull-out profile being displacable by a guide carriage connected to each side edge of the pull-out profile; and
   at least two support bodies connected to each side of the flexible shading structure and protruding into lateral receiving spaces of the guide arrangements, the at least two support bodies being spaced apart from one another in the pulling-out direction of the shading structure, a body thickness of each of the at least two support bodies being greater than a shading thickness of the shading structure, each of the at least two support bodies being guided within complementary support channel sections of the receiving spaces and each of the at least two support bodies on each side of the flexible shading structure moving along a single line as the shading structure moves between the rest position and the shading position;
   wherein each of the support channel sections of the receiving spaces includes, in cross-section, a pair of elongate opposite aligned walls having an open entrance area at one end of the pair of walls and an end area at the other end of the pair of walls, each of the support bodies moving within the support channel sections of the receiving spaces flanked by the pair of elongate opposite aligned walls between the open entrance area of the support channel sections of the receiving spaces and the end area, with the support bodies moving toward and away from the open entrance area and the end area as the shading structure moves between the rest position and the shading position.

12. The shading device as claimed in claim 11, wherein sliding of the at least two support bodies in the support channel sections yields virtually no increase in overall friction forces during a displacement of the shading structure between the rest position and the shading position.

13. The shading device as claimed in claim 11, wherein the at least two support bodies are positioned laterally outside longitudinal edges of the shading structure and are fastened to the shading structure by a laterally projecting tab or strip sections.

14. The shading device as claimed in claim 11, wherein the at least two support bodies are integrated into the shading structure, each support body being spaced apart in a longitudinal direction and being assigned to a complementary cutout in the shading structure into which the respective support body protrudes when the shading structure is wound up on a winding shaft.

15. The shading device as claimed in claim 11, wherein the pair of elongate opposite aligned walls are continuous between the open entrance area and the end area.

16. The shading device as claimed in claim 11, wherein the elongate opposite aligned walls are longer than spaces between the elongate opposite aligned walls at the open entrance area and at the end area.

17. The shading device as claimed in claim 16, wherein a pair of lateral shading structure sections of the shading structure protrude into the receiving spaces at the open entrance area.

18. The shading device as claimed in claim 11, wherein the support bodies move within the support channel sections of the receiving spaces along a movement direction line, with the movement direction line extending through the open entrance area.

19. The shading device as claimed in claim 18, wherein the movement direction line is straight.

* * * * *